March 28, 1950     P. C. EFROMSON ET AL     2,502,132
PICKUP FOR USE IN ACCELERATION INDICATING,
MEASURING, AND RECORDING APPARATUS Filed Jan. 5, 1949                        2 Sheets-Sheet 1

Inventors
Philip C. Efromson
Robert C. Lewis
by Robert Cushman Crows
Att'ys

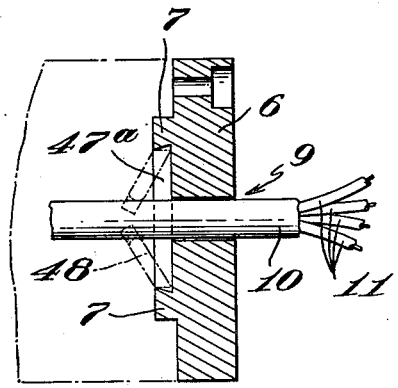
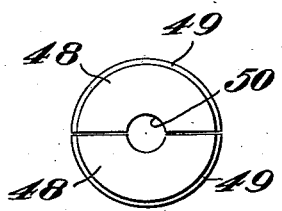
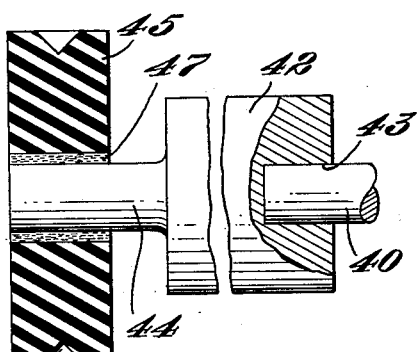
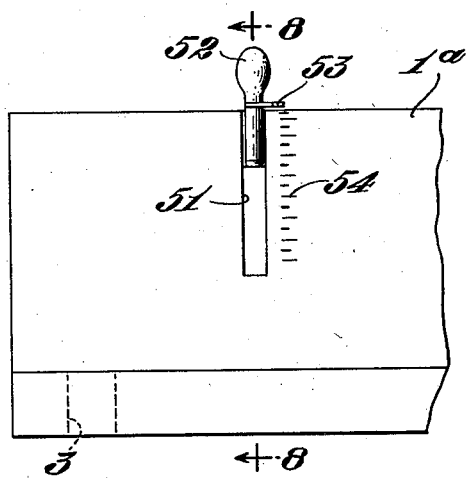
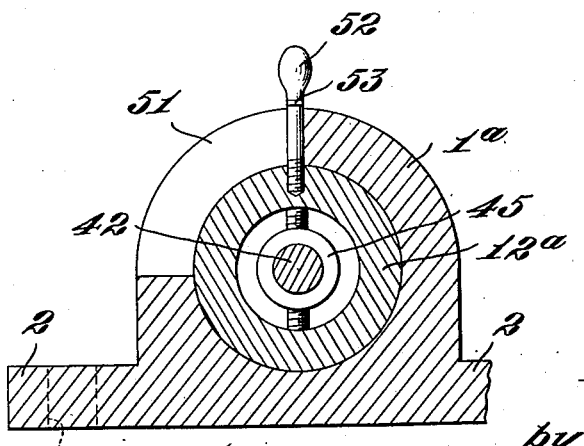

Patented Mar. 28, 1950

2,502,132

UNITED STATES PATENT OFFICE 2,502,132

PICKUP FOR USE IN ACCELERATION INDICATING, MEASURING, AND RECORDING APPARATUS

Philip C. Efromson and Robert C. Lewis, Winchester, Mass.

Application January 5, 1949, Serial No. 69,354

17 Claims. (Cl. 250—27.5)

This invention pertains to electrical apparatus for use in indicating, measuring or recording acceleration, more particularly (but not exclusively) acceleration in vibratory motion of small amplitude, and relates more especially to a pickup or transducer device for use in such apparatus.

The observation and measurement of acceleration is now recognized as of the utmost importance in the design of moving parts or of parts which are subjected during use to variable and especially suddenly applied loads or shocks. In the design of aircraft, ships, automotive engines, for specific examples, the study of vibrational acceleration is of primary importance.

Electrical apparatus which is highly responsive to current or voltage variations and which will indicate, measure or record such variations, is readily available and sufficiently sensitive for use in the study of acceleration, but prior pickup devices for translating mechanical acceleration into electrical current or voltage variations have not been altogether satisfactory for one reason or another. It has been proposed to employ a vacuum or thermionic tube as a pickup device, the tube employed for the purpose having relatively movable electrodes whose positions change in response to variations in acceleration of relatively movable parts, for instance, of the electrodes themselves. Such a vacuum tube pickup may be designed to have an output sufficiently large to be used directly and without amplification by the indicating or recording instrument. By the use of such a vacuum tube pickup, it is possible, for example, to indicate and record linear responses for frequencies, for example, of two hundred cycles per second and accelerations of twenty times gravity. However, such a pickup is useful for a wide range of conditions, for further example, for frequencies of fifteen hundred cycles per second, and for accelerations of one thousand times gravity. Difficulty has heretofore been experienced in maintaining a constant zero in such pickup devices and in providing a vacuum tube type of pickup whose performance will not be injuriously affected by rough handling, exposure to heavy or high frequency variations or to shock or pressure.

The present invention has for its principal object the provision of a pickup or transducer of the vacuum-tube type which is rugged in construction; which is easy to apply; which is not injuriously affected by exposure to heavy vibrations, shocks or pressure; and which is simple and easy to make and assemble.

A further object is to provide a pickup of the vacuum-tube type wherein an inertia mass, external to the vacuum tube, is so connected to the movable internal element or elements of the tube as to produce variations in the electrical output of the tube in exact accordance with movements of the inertia mass. A further object is to provide a pickup of the vacuum-tube type wherein the inertia mass is of simple shape, readily exchangeable for another in accordance with the circumstances of use, and preferably with provision for dampening vibrations of the inertia mass so as to prevent response of the instrument to the natural frequency of vibrations of the system including the inertia mass itself and the diaphragm, and for limiting the amplitude of vibration of the inertia mass. A further object is to provide a pickup of the vacuum-tube type having provision for so supporting the vacuum tube as effectively to protect it from the effects of externally applied stress, such as might distort it or change its electrical characteristics. A further object is to provide a pickup of the vacuum-tube type comprising a rigid, outer case which houses the vacuum tube, the case being readily attachable to the vibrating part or structure to be studied, but with provision for so supporting the vacuum tube as to minimize the transmission to the tube of stresses arising from distortion of the case. A further object is to provide a novel and useful clamping means for the conductor cable where the latter enters the outer casing of the device and to provide a pickup having a very high electrical output as compared with pickups heretofore used in the measurement of acceleration. Other and further objects and advantages of the invention will be pointed out in the following more detailed description and by reference to the accompanying drawings wherein:

Fig. 4 is a fragmentary, diametrical section through the end cap of the outer casing of the device showing certain details of a desirable form of cable clamp associated with said end cap;

Fig. 5 is an elevation of a divided washer constituting an element of the cable-clamping means;

Fig. 6 is a vertical section, partly in elevation, illustrating the inertia mass and vibration damping means associated with it;

Fig. 7 is a fragmentary side elevation of a modified form of the apparatus; and

Fig. 8 is a section on the line 8—8 of Fig. 7.

Figure 1:
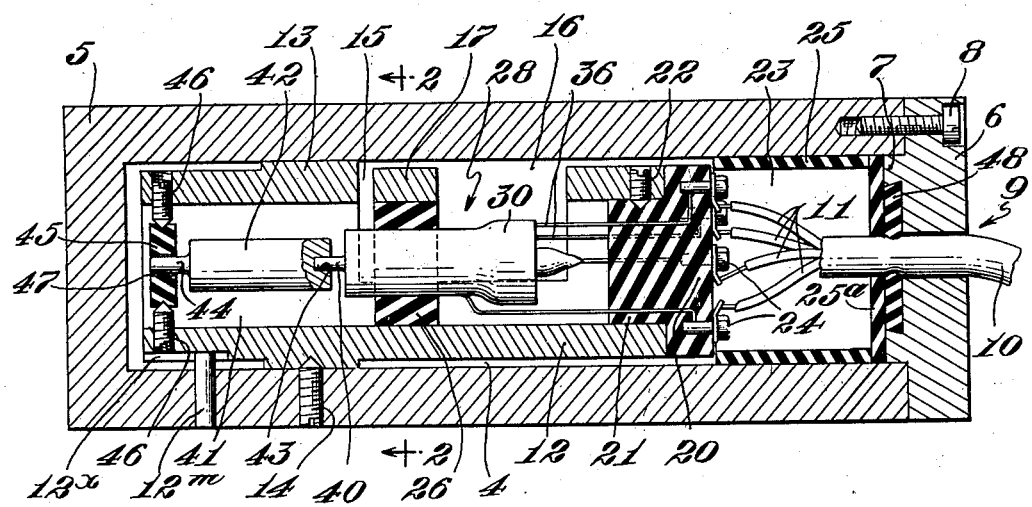
Fig. 1 is a longitudinal section through a pickup device embodying the present invention.
Figure 2:
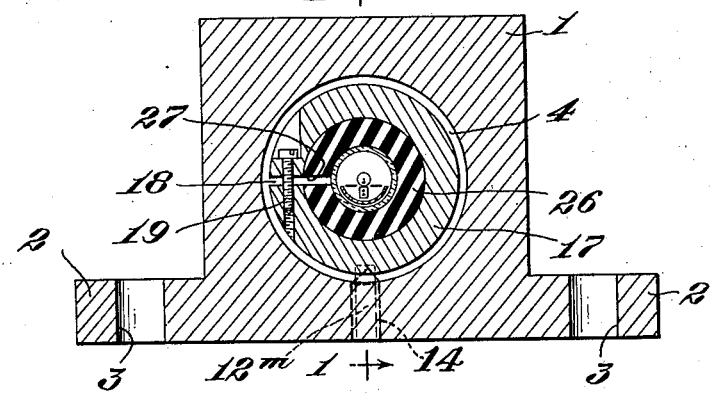
Fig. 2 is a section substantially on the line 2—2 of Fig. 1.

Referring to the drawings, the numeral 1 designates the outer case of the pickup device. As illustrated in Figs. 1 and 2, this case comprises an integral block of rigid material, for example steel, which is sufficiently strong and rigid to withstand rough handling and heavy pressure without substantial deformation. As illustrated, the body of the case is of substantially rectangular, transverse section and has integral bottom flanges 2 having accurately smooth and aligned undersurfaces, and provided with holes 3 for the reception of attaching bolts, by means of which the case may be secured to the machine part or structure whose vibrations are to be studied.

The body portion of the case is provided with an elongate, cylindrical bore or chamber 4, here shown as closed at its left-hand end (Fig. 1) by an integral portion 5 of the material of the casing. The opposite end of the chamber 4 is closed by a removable cap 6 having an annular boss 7 at its inner face which fits snugly within the chamber 4. The cap is provided with openings for the reception of screws 8 by means of which it is removably secured to the casing proper. The cap has a central passage 9 through which the cable 10 enters the chamber 4, the cable being provided with the requisite number of conductor wires 11 to supply the necessary current and to convey the resulting output electrical impulses to the apparatus used in observing or recording the vibrations which are being studied or measured.

Within the chamber 4 there is arranged a cylindrical sleeve or carrier member 12 of a suitable rigid material, for example, steel or brass. The main body of this sleeve 12 is of an external diameter less than that of the chamber 4, but at one point in its length the sleeve 12 is provided with an external peripheral rib 13 which is of an external diameter such as to make a snug fit with the wall of the chamber 4. As here illustrated merely by way of example, the rib 13 is of a width (axially of the sleeve) approximating one-sixth of the length of the sleeve. Desirably, the rib should be as narrow (axially) as is consistent with the requirement that it support the sleeve immovably, in coaxial relation to the casing. By the use of this narrow rib as the side support for the sleeve, the transmission of bending or torsional stresses from the outer case to the sleeve is minimized. The rib is spaced a distance approximating its width from the left-hand end (Fig. 1) of the sleeve. One or more set screws 14, passing through threaded openings in the wall of the outer casing 1, are preferably employed for holding the sleeve 12 in fixed position within the chamber 4.

The sleeve 12 is transversely slotted at 15, to a depth approximating its radius, and is also slotted at 16 to a similar depth. As illustrated, merely by way of example, the slot 15 defines the right-hand (Fig. 1) face of the rib 13 and may be merely a saw-cut. On the other hand, the slot 16 is of substantial axial width, so as to give access to the body of the tube to facilitate rotational adjustment of the tube. These slots partially isolate a tube-support 17 from the end portions of the sleeve. The axial width of the portion 17 is such as to provide desired rigidity of support to the tube, but at the same time to leave the opposite ends of the tube free from clamping stress. This tube-support 17 is radially split as indicated at 18, Fig. 2, and a clamping screw 19 is arranged to draw the parts of the tube-support 17 of the sleeve at opposite sides of the slit 18 toward each other.

The right-hand end of the sleeve 12, as viewed in Fig. 1, is closed by means of a plug 20 of electrical insulating material, this plug having a circular boss 21 at its left-hand face which fits snugly within the sleeve 12 and which is engaged by one or more set screws 22 which hold the insulating plug in place in the sleeve. The right-hand face of the plug 20 is spaced from the end cap 6 to leave a chamber 23. Terminal posts 24 are fixed in the block 20 and project into the chamber 23, the side wall of the latter preferably being lined with an insulating sleeve 25. This sleeve does not extend to the surface of the boss 7, but its right-hand end bears against a washer 25$^a$ of insulating material which covers the inner face of the boss 7. The conductor wires 11 comprised in the cable 10, enter the chamber 23 and are connected to the proper terminal posts 24. Preferably, the left-hand end of the sleeve 12 (Fig. 1) is provided with an axially extending keyway 12$^x$ which receives a pin or key 12$^m$ set into the wall of case 1 so as to prevent rotation of the sleeve relatively to the case.

Within the tube-support 17 there is arranged a split annulus 26 of electrical insulating material. This annulus is split, as shown at 27 (Fig. 2), the split 27 being radially aligned with the slit 18 in the part 17. The outer diameter of the annulus 26 is such that it fits snugly within the tube support 17. By tightening the screw 19, the annulus may be firmly clamped within the tube-support 17. The body portion of a thermionic or vacuum tube 28 fits within the annulus 26 and is held firmly in place and supported by the annulus when the screw 19 is tightened.

Figure 3:
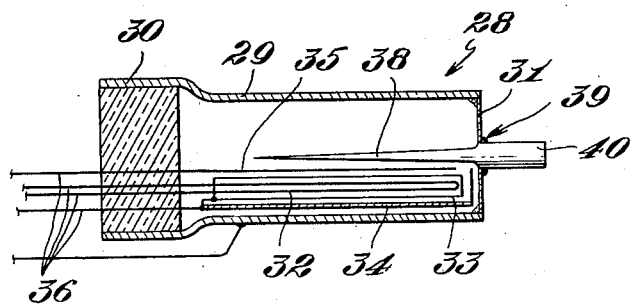
Fig. 3 is a diagrammatic, longitudinal section through a thermionic or vacuum tube of a type useful in the practice of the present invention.

The vacuum tube 28, which is preferably employed in the practice of the present invention, is of the general type diagrammatically illustrated in Fig. 3. Tubes of this general type are commercially available, so that precise details of construction are not here necessary. This tube has a metal shell 29 which also constitutes the main part of the anode, the shell being fixed to a suitable base 30. The right-hand end of the shell, as viewed in Fig. 3, is hermetically sealed by means of a thin, flexible metal diaphragm 31. Within the tube there is arranged the heating filament 32 and the cathode 33. Preferably a shield 34 is interposed between the cathode and the outer shell at one side of the tube. This shield 34 may be of generally semicylindrical shape so as to protect the cathode throughout a semicircumference of the tube. The grid 35 is at the opposite side of the cathode from the shield. Suitable leads 36 extend from the electrodes out through the base 30 and may be connected to the usual pins (not shown) projecting from the base and designed to enter suitable sockets, for example, in the insulating block 20. However, as illustrated, for simplicity, these leads extend directly from the base of the tube through the block 20 and are connected to the terminal posts 24. The grid may or may not perform its usual function. Thus, it may be used normally, or to introduce a signal or wave carrier to be modulated by the anode spacing. When it is not used functionally, it may be connected externally to the cathode.

At the opposite side of the grid from the cathode, there is arranged a movable electrode 38 forming a part of the anode. While this electrode 38 may be of other shape, it is here illustrated as an elongate, tapering needle-like element substantially parallel to the heating filament 32 and having its thicker end rigidly secured, for example, by brazing, to the central part of the diaphragm 31. The diaphragm thus forms a flexible support for the movable electrode 38, the latter being capable of oscillating toward and from the cathode about the fulcrum provided by the diaphragm. As here illustrated, a pin or actuator lever 40, aligned with the electrode 38, is arranged at the exterior of the diaphragm 31, one end of the pin 40 being rigidly secured, as by brazing, at 39 to the diaphragm. While this pin or actuating lever 40 may be a separate part, it is convenient to make this pin 40 as an integral continuation of the needle-like electrode 38. When so formed, the diaphragm is provided with an opening through which the part 38 may be thrust to the desired extent and then the part 40 is secured, as above suggested, by brazing to the diaphragm, leaving the part 40 projecting outside of the tube. By applying force to the part 40, the part 38 may be caused to swing toward and from the cathode, thus varying the electrical field within the tube and setting up variations in the output current. Since the electrode 38 may be made of very small dimensions, the movable inertia mass which is employed for varying the output impulses may be very small indeed, if desired. Since this movable electrode 38 is supported at one end only and solely by the very simple flexible diaphragm element, the tube may be constructed very readily, since it involves the use of few parts and these parts are of a nature such as to facilitate their handling and assembly. Furthermore, since, if desired, the movable electrode may be assembled with and united to the diaphragm before the latter is applied to the end of the tube, it is not necessary to perform any delicate assembly operations within the confines of the tube, thus further facilitating the manufacture of the tube. No springs or long and delicate supporting elements are used and thus the structure is not subject to change in location of its parts by small temperature variations and the parts are not readily displaceable permanently by shocks or heavy vibration.

The tube 28 is mounted in the annulus 26 and clamped firmly in place by the screw 19, as above described, with the pin 40 located in the chamber 41 at the left-hand side of the annulus 26. Within this chamber there is arranged the inertia mass 42, here shown as an elongate solid cylinder of metal having a socket 43 in one end which is of a size to receive the pin 40 with a snug fit. Preferably the pin is soldered into the socket although this may not be necessary if a sufficiently accurate mechanical fit is provided. While an inertia mass of the shape here illustrated has certain advantages, particularly from the manufacturing standpoint, inertia masses of other shapes, for example, spherical, may be used. The left-hand end of the inertia mass, as illustrated in Fig. 6, is reduced in diameter at 44 and this reduced portion or tail piece is embraced by a motion-limiting ring 45 disposed within the left-hand end of the chamber 41 and adjustable in its own plane by means of set screws 46 having threaded engagement with openings in the sleeve 12. Preferably four such screws are provided arranged 90° apart so that the ring may be adjusted very accurately. The central opening of this ring is somewhat larger than the external diameter of the part 44 of the inertia mass, for example it may be a few thousandths of an inch larger, and in the annular space between the ring and the part 44 there is arranged a mass 47 of oil or other viscous fluid which acts as an oscillation dampener for the inertia mass. It may be noted that the inertia mass is supported solely by its connection to the pin 40, except for such slight support as may be afforded by the body of oil 47. While the stop ring and damping fluid-film are desirable, they may be dispensed with, particularly when the inertia mass is very small.

Since the sleeve 12 contacts the outer casing only at the rib 13, any slight deformation of the outer casing as a result of pressure or impact is substantially neutralized as respects its effect on the tube 28 by reason of the manner of supporting the tube as here described.

In order to secure the cable 10 to the cap 6 so that the cable may not be pulled away from the terminal posts 24, it is preferred to provide the inner or left-hand face of the cap 6 with an annular rabbet 47ᵃ (Fig. 4) having undercut edges and to provide a pair of semicircular washers 48 (Fig. 5) having beveled edges 49 which seat in the rabbet 47ᵃ when the parts are assembled. In assembling the parts, and before the cap 6 is attached to the case 1, the cable is first passed through the opening 9 in the cap, and the two half washers 48 are then arranged with their beveled edges in the rabbet 47ᵃ and inclining away from the cap, as shown in dotted lines in Fig. 4, and with their inner edges 50 in contact with the outer surface of the cable. With the parts thus positioned, the cable 10 may be subjected to an outward pull which causes the inner edges 50 of the half washers 48 to bite into the covering of the cable, the outward movement of the cable being continued until the washers assume the position shown in Fig. 1 where their beveled edges are fully seated in the undercut rabbet 47ᵃ and with their inner edges biting into the cable covering and with the two half washers lying in the same plane and in contact with the inner wall of the rabbet 47ᵃ. In this position the washers lock the cable in place so that outward force cannot unduly stress the connections of the wires 11 to the terminal posts 24. When the cap 6 is now assembled with the case 1, the edge of the rigid washer 25ᵃ bears against the end of the lining sleeve 25 and provides a rigid abutment which holds the half-washers in cable-locking position.

In Figs. 7 and 8 a slight modification is illustrated wherein the outer casing 1ᵃ is of more or less semicylindrical shape and has a circumferential slot 51 leading to the chamber 4. In this arrangement the sleeve 12ᵃ, instead of being fixed in position, is arranged for peripheral rotation within the outer case. A handle 52 extends out through the slot 51, but is rigidly secured at its inner end to the sleeve 12ᵃ, so that by moving the handle the sleeve may be rotated, for example through an arc of 90°. A pointer 53 secured to the handle cooperates with graduations 54 to indicate the adjustment of the sleeve 12.

Since it is only motion of the movable electrode 38 toward and from the cathode 33 that produces any substantial change in the output circuit, the instrument, as illustrated in Figs. 1, 2 and 3, would only be sensitive to vibrations in the vertical plane. However, by securing the base flanges 2 against a vertical surface of a vibrating part, the instrument could be made to respond to vibrations in the horizontal plane. By the arrangement shown in Figs. 7 and 8, the device may be made to respond to vibrations in the vertical, horizontal or intermediate planes merely by swinging the sleeve 12 by means of the handle 52.

While the particular form of tube herein illustrated and described is very desirable for the reasons above pointed out, the invention is not necessarily limited to the use of a tube of this precise form since it is contemplated that other tubes have been or may be devised in which there is a movable electrode whose position is controlled mechanically by a part located wholly outside of the tube, and such tubes may be substituted for that here specifically referred to.

In the operation of the device, vibrations of a part to which the case 1 is secured produce a relative movement of the case 1 and the inertia mass 42 which in turn produces a movement of the electrode 38, thus setting up oscillatory impulses in the output circuit of the tube, such impulses acting at the indicating or recording apparatus to set up oscillations of an indicator of convential type, it being noted that in the apparatus as herein disclosed, relative movement of the inertia mass 42 and case 1 is, throughout the range of usefulness of the pickup, proportional to the acceleration imposed upon the case 1.

By the use of a vacuum tube, such as here illustrated, it is not usually necessary to amplify the output current, but it is contemplated that amplification may be provided if necessary under any particular set of circumstances.

Desirable embodiments of the invention have here been illustrated but only by way of example, it being understood that any modifications falling within the scope of the appended claims are to be regarded as within the purview of the invention.

We claim:

1. A pickup of the kind which employs a vacuum tube for transforming mechanical motion into electrical impulses and which has conductor leads designed to be connected to an instrument which is sensitively responsive to such electrical impulses and wherein the vacuum tube has at least one movable electrode, characterized in having a movable actuator, external to the tube, which is rigidly connected to the electrode for moving the latter, and in having an inertia mass outside of the tube and which is rigidly attached to said movable actuator.

2. A pickup of the kind which employs a vacuum tube for transforming mechanical motion into electrical impulses and which has conductor leads designed to be connected to an instrument which is sensitively responsive to such electrical impulses and wherein the vacuum tube has at least one movable electrode, characterized in having a movable actuator, external to the tube, which is rigidly connected to the electrode for moving the latter, a rigid inertia mass external to the tube and which is rigidly attached to said movable actuator, and means for damping oscillations of the inertia mass.

3. A pickup of the kind which employs a vacuum tube for transforming mechanical motion into electrical impulses and which has conductor leads designed to be connected to an instrument which is sensitively responsive to such electrical impulses and wherein the vacuum tube has at least one movable electrode, a movable actuator, external to the tube, which is rigidly connected to the electrode for moving the latter, a rigid mass external to the tube and rigidly attached at one end to said actuator, a motion-limiting ring encircling a portion of said inertia mass, and means for adjusting the ring in its own plane.

4. A pickup of the kind which employs a vacuum tube for transforming mechanical motion into electrical impulses and which has conductor leads designed to be connected to an instrument which is sensitively responsive to such electrical impulses and wherein the vacuum tube has at least one movable electrode and a movable actuator, external to the tube, which is rigidly connected to the electrode for moving the latter, characterized in having a substantially cylindrical, elongate inertia mass external to the tube and rigidly attached at one end to said actuator in coaxial relation to the tube, a ring encircling the opposite end portion of the inertia mass, and an annular body of viscous liquid intervening between the ring and said latter end portion of the inertia mass and constituting vibration damping means.

5. In combination in a pickup of the class described, a rigid case provided with means whereby it may be attached to a vibrating part, the case having an internal chamber of substantially cylindrical shape, a substantially cylindrical sleeve within said chamber, the sleeve having an external peripheral rib intermediate its ends and which contacts the wall of the chamber, the sleeve being otherwise free from contact with the case, an annulus which fits snugly within the sleeve intermediate the ends of the latter, a vacuum tube coaxial with and supported by the annulus, an inertia mass within the sleeve at one side of said annulus, the tube having a movable internal electrode, and means rigidly connecting the inertia mass to said movable electrode.

6. In combination in a pickup of the class described, a rigid case provided with means whereby it may be attached to a vibrating part, the case having an internal chamber of substantially cylindrical shape, a substantially cylindrical sleeve within said chamber, the sleeve having an external peripheral rib which contacts the inner surface of the case, the sleeve being spaced from the case except at said rib, a vacuum tube coaxial with the sleeve and within the latter, said tube having a movable internal electrode, an inertia mass outside of the tube but within the sleeve, and means rigidly connecting the inertia mass to the movable electrode.

7. In combination in a pickup of the class described, a rigid case provided with means whereby it may be attached to a vibrating part, the case having an internal chamber of substantially cylindrical shape, a substantially cylindrical sleeve within said chamber, the sleeve having an external peripheral rib which contacts the inner surface of the case, the sleeve being spaced from the case except at said rib, a closure block of insulating material filling one end of the sleeve, a ring coaxial with and arranged within the other end of the sleeve, means for adjusting the ring in its own plane, an annulus of insulating material fitting snugly within the sleeve substantially midway between said block and ring, a vacuum tube supported by the annulus, said tube having a movable internal electrode, an actuator lever outside the tube and rigidly connected to the movable electrode, an inertia mass rigidly secured to the actuator lever and having its other end disposed within said ring, a film of viscous fluid intervening between said latter end of the inertia mass and the ring and constituting vibration damping means, terminal posts fixed to the block, and conductor leads extending from the vacuum tube to said posts.

8. In combination in a pickup device of the class described, a vacuum tube which houses electrodes and which has conductor leads designed to be connected to an instrument which is sensitively responsive to electrical impulses, the wall of the tube comprising a flexible diaphragm to which one end of one of the electrodes is rigidly secured and which constitutes a support for said electrode, a pin external to the tube rigidly attached at one end to the diaphragm and constituting an actuator by means of which said electrode may be oscillated, and an inertia mass having a socket in which the opposite end portion of said pin is snugly fitted.

9. In combination in a pickup device of the class described, a vacuum tube which houses electrodes and which has conductor leads designed to be connected to an instrument which is sensitively responsive to electrical impulses, the wall of the tube comprising a flexible diaphragm to which one end of one of the electrodes is rigidly secured and which constitutes a support for said electrode, a pin external to the tube rigidly attached at one end to the diaphragm and constituting an actuator by means of which said electrode may be oscillated, a substantially cylindrical, elongate inertia mass external to the tube having an axial socket in one end, the outer end of said pin fitting snugly in said socket, the inertia mass having a tail portion of reduced diameter at its opposite end, a ring encircling said tail portion, adjustable supporting means for the ring, and vibration damping means interposed between the ring and said tail portion of the inertia mass.

10. In combination in a pickup device of the class described, a vacuum tube which houses electrodes and which has conductor leads designed to be connected to an instrument which is sensitively responsive to electrical impulses, the wall of the tube comprising a flexible diaphragm to which one end of one of the electrodes is rigidly secured and which constitutes a support for said electrode, a pin external to the tube rigidly attached at one end to the diaphragm and constituting an actuator by means of which said electrode may be moved, an elongate inertia mass external to the tube having one end rigidly attached to one end of said pin, the inertia mass having a tail portion of relatively small diameter at its opposite end, a ring encircling said tail portion, means for adjusting the ring in its own plane, and a body of viscous fluid interposed between the ring and said tail portion and constituting vibration damping means for the inertia mass.

11. In combination in a pickup device of the class described, a vacuum tube which houses electrodes and which has conductor leads designed to be connected to an instrument which is sensitively responsive to electrical impulses, one end wall of the tube consisting of a flexible diaphragm to which one end of one of the electrodes is rigidly secured and which constitutes a support for said electrode, a pin external to the tube rigidly attached at one end to the diaphragm and constituting an actuator by means of which said electrode may be oscillated, an inertia mass rigidly attached to the outer end of said pin, a split annulus of electrical insulating material embracing the tube, means for contracting the annulus about the tube, a sleeve embracing the annulus, and a rigid casing housing the sleeve.

12. In combination in a pickup device of the class described, a vacuum tube which houses electrodes and which has a base at one end through which pass conductor leads designed to be connected to an instrument which is sensitively responsive to electrical impulses, the opposite end of the tube being closed by a flexible diaphragm to which one end of one of the electrodes is rigidly secured and which constitutes a support for said electrode, a pin external to the tube rigidly attached at one end to the diaphragm and constituting an actuator by means of which said electrode may be oscillated, an inertia mass rigidly attached to the outer end of said pin, an annulus which snugly embraces the tube, a sleeve coaxial with and embracing the annulus, the sleeve providing a chamber at one side of the annulus for the reception of the inertia mass, a sleeve-closing plug of insulating material at the opposite side of the annulus, said plug being provided with terminal posts for the tube leads, and a rigid casing housing the sleeve.

13. In combination in a pickup device of the class described, a vacuum tube which houses electrodes and which has at one end a base and conductor leads passing through the base, the opposite end of the tube being closed by a flexible diaphragm to which one end of one of the electrodes is rigidly secured and which constitutes a support for said electrode, a pin external to the tube rigidly attached at one end to the diaphragm and constituting an actuator by means of which said electrode may be moved, an inertia mass rigidly attached to the outer end of said pin, an annulus of insulating material snugly embracing the tube, a cylindrical sleeve which embraces the annulus, the annulus being located intermediate the ends of the sleeve, the sleeve defining a chamber at one side of the annulus for the reception of the inertia mass, the sleeve having an external, peripheral rib near the location of said chamber, an external rigid casing which houses the sleeve and which supports the sleeve solely by contact with the peripheral rib of the latter, means operative to prevent rotation of the sleeve relatively to the casing, and a conductor cable which passes through an aperture in the wall of the casing.

14. In combination in a pickup of the class described, a rigid case having an interior chamber, a vacuum tube having a movable electrode housed within the chamber, an inertia mass exterior to the tube, a support for said inertia mass rigidly united to the movable electrode, an insulating plug, terminal posts fixed to the plug, conductors extending from the tube to the posts, a cable passing through an aperture in the wall of the casing and comprising wires connected to the terminal posts, and means for clamping the cable to the casing.

15. In combination in a pickup of the class described, a rigid case having an interior chamber for housing a vacuum tube and an inertia mass, the casing having a removable cap provided with an aperture for the passage of a cable, said cap having an undercut circular rabbet in its inner face coaxial with the aperture, and a diametrically divided washer having a beveled edge which seats in said rabbet, and which is operative to clamp a cable to the cap.

16. In combination in a pickup of the class described, a rigid case having an interior chamber for housing a vacuum tube and an inertia mass, a rotatable sleeve within the chamber having means for supporting a vacuum tube, and means whereby said sleeve may be rotated within the chamber.

17. In combination in a pickup of the class described, a rigid case having an interior chamber for housing a vacuum tube and an inertia mass, the chamber being substantially cylindrical, a cylindrical, rotatable sleeve within the chamber, means within the sleeve for supporting a vacuum tube, means for rotating the sleeve within the chamber, and means for indicating the angular position of the sleeve.

PHILIP C. EFROMSON.
ROBERT C. LEWIS.

REFERENCES CITED

The following references are of record in the file of this patent:

UNITED STATES PATENTS

| Number | Name | Date |
| --- | --- | --- |
| 2,110,449 | Linder | Mar. 8, 1938 |
| 2,130,648 | Mott-Smith | Sept. 20, 1938 |
| 2,210,970 | Bonell | Aug. 13, 1940 |
| 2,311,427 | Winkelmeyer | Feb. 16, 1943 |
| 2,371,626 | Kecskemeti | Mar. 20, 1945 |
| 2,427,285 | Kershaw | Sept. 9, 1947 |
| 2,436,753 | Kuhn et al. | Feb. 24, 1948 |

OTHER REFERENCES

Article, "Vacuum Tube as Electro-Mechanical Transducer," at pp. 66–67 of July 1927 of "Tele-Tech" Magazine.